000
(12) United States Patent
Angelov

(10) Patent No.: US 9,390,265 B2
(45) Date of Patent: Jul. 12, 2016

(54) ANOMALOUS SYSTEM STATE IDENTIFICATION

(71) Applicant: University of Lancaster, Lancaster (GB)

(72) Inventor: Plamen Angelov, Lancaster (GB)

(73) Assignee: University of Lancaster, Lancaster (GB)

( * ) Notice: Subject to any disclaimer, the term of this patent is extended or adjusted under 35 U.S.C. 154(b) by 0 days.

(21) Appl. No.: 14/541,036

(22) Filed: Nov. 13, 2014

(65) Prior Publication Data
US 2015/0113649 A1 Apr. 23, 2015

Related U.S. Application Data

(63) Continuation of application No. PCT/GB2013/051237, filed on May 14, 2013.

(30) Foreign Application Priority Data

May 15, 2012 (GB) .................................. 1208542.9
Oct. 10, 2012 (GB) .................................. 1218216.8

(51) Int. Cl.
*H04L 29/00* (2006.01)
*G06F 21/56* (2013.01)
(Continued)

(52) U.S. Cl.
CPC ............ *G06F 21/56* (2013.01); *G06F 11/0751* (2013.01); *G06N 7/005* (2013.01); *G06F 11/3055* (2013.01)

(58) Field of Classification Search
CPC ......................................................... H04L 1/22

USPC ........................................................... 726/23
See application file for complete search history.

(56) References Cited

U.S. PATENT DOCUMENTS

| 2002/0122570 A1 | 9/2002 | Paragios et al. |
| 2003/0014692 A1* | 1/2003 | James ............ G05B 17/02 714/25 |

(Continued)

FOREIGN PATENT DOCUMENTS

| GB | 2 361 336 | 10/2001 |
| WO | 2007/008956 | 1/2007 |
| WO | 2010/131001 | 11/2010 |

OTHER PUBLICATIONS

Search Report dated Sep. 10, 2012 from GB Application No. 1208542.9.

(Continued)

*Primary Examiner* — Brandon Hoffman
*Assistant Examiner* — Michael D Anderson
(74) *Attorney, Agent, or Firm* — Beyer Law Group LLP

(57) ABSTRACT

A real-time method and data processing apparatus for identifying an anomalous state of a system are described. The system includes a sensor outputting time series data items relating to a property of the system. A current data item is received from the sensor. An estimate of a current data density for the time series data items is recursively estimated using the current data item. At least one statistical property of the estimate of the current data density is recursively calculated. It is determined, from the at least one statistical property, whether the current data item indicates an anomalous state of the system. A signal is output if it is determined that the current data item indicates an anomalous state of the system.

19 Claims, 10 Drawing Sheets

(51) Int. Cl.
  *G06F 11/07* (2006.01)
  *G06N 7/00* (2006.01)
  *G06F 11/30* (2006.01)

(56) References Cited

U.S. PATENT DOCUMENTS

2008/0270071 A1 10/2008 Marvasti et al.
2008/0306715 A1 12/2008 Tsai et al.
2010/0036780 A1 2/2010 Angelov

OTHER PUBLICATIONS

Search Report and Written Opinion dated Sep. 10, 2013 from International Application No. PCT/GB2013/051237.

* cited by examiner

Fig. 3

| k | $\sigma_D$ | $\bar{O}$ | D | Σ | $\bar{\bar{V}}$ | $\bar{\bar{A}}$ | $\bar{\bar{P}}$ |
|---|---|---|---|---|---|---|---|
| 0 | | | | | | | |
| 1 | | | | | | | |
| 2 | | | | | | | |
| ⋮ | | | | | | | |

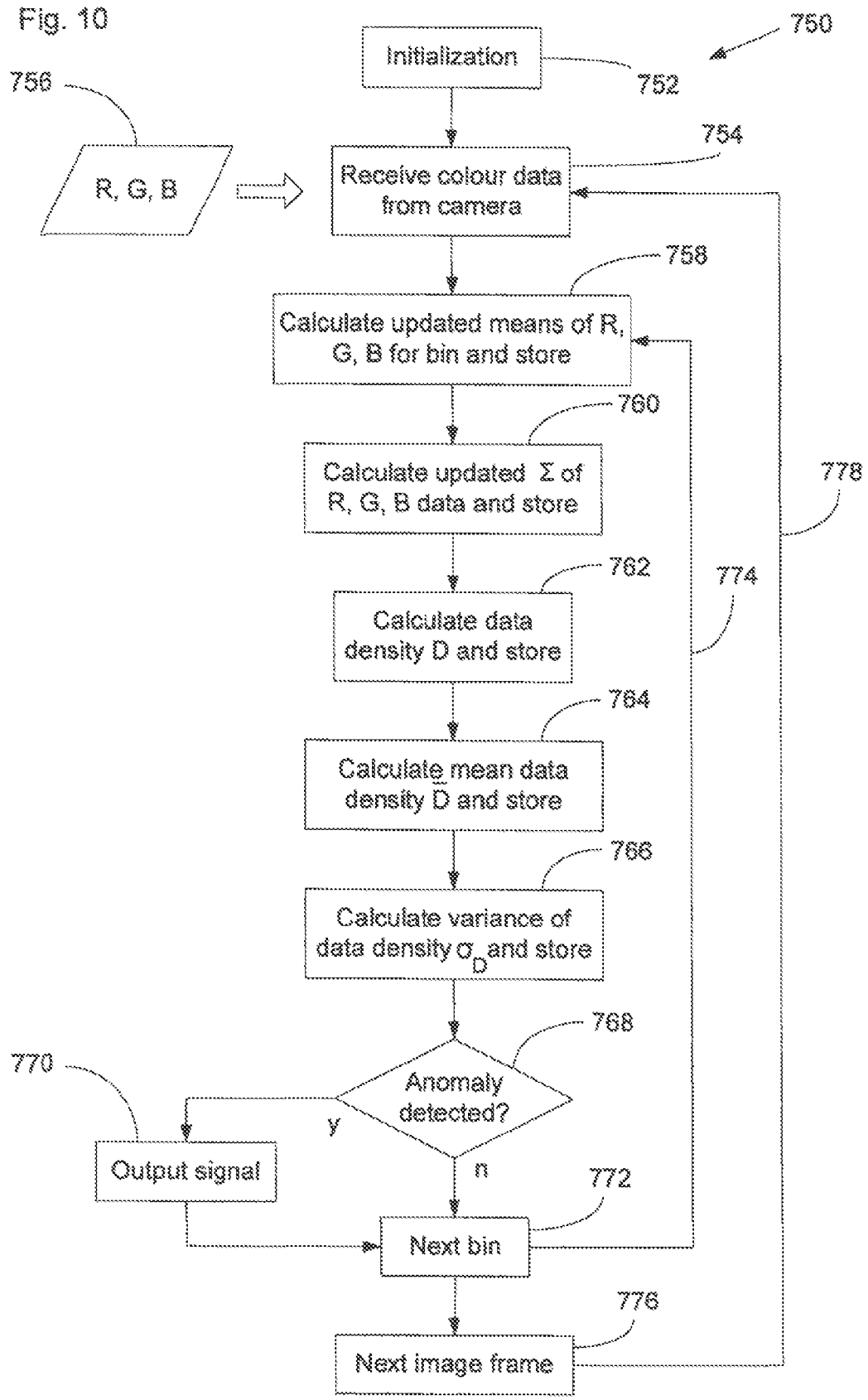

ANOMALOUS SYSTEM STATE IDENTIFICATION

This application is a Continuation of International Application No. PCT/GB2013/051237, filed on May 14, 2013, the contents of which is hereby incorporated in its entirety.

The present invention relates to methods, apparatus and computer programs for identifying anomalous states in systems, and in particular multi-sensor systems in real time.

There are a large number of systems in which it is desirable to be able reliably to identify anomalous behavior. The anomalous behavior of the system may be indicative of a variety of different behaviors of the system such as incorrect operation, sub-optimal operation or merely a difference in operation away from the norm. In complicated systems with many parts it can be difficult to identify exactly what part is causing the anomalous behavior. Also, in some complicated systems, it may be very difficult to detect that the system's overall behavior is anomalous as the effect of one or more parts on the overall system may be very subtle.

Yet further, it can be very difficult to identify anomalous behavior in complicated systems in real time owing to the very large number of parts and/or combinations of parts which may need to be assessed. While such systems can be assessed in a non-real time mode, i.e. by collecting large amounts of data and analysing that data, such an approach can be of little use when real-time anomaly detection is required, for example for health and safety reasons.

Novelty, both anomaly and outlier, detection is a difficult task even if done off-line and is even more difficult to do in real-time without very significant data processing resources. However, in many applications it would be preferable to be able to reliably identify anomalies in real-time and a number of approaches have been adopted. Traditionally, statistical approaches have been based on data density estimation and kernel density estimation is one of the most popular approaches for this task, an example of which is described in T. Hastie, R. Tibshirani, and J. Friedman, *The Elements of Statistical Learning: Data Mining, Inference and Prediction*. Heidelberg, Germany: Springer Verlag, 2001.

Hence, there is a need for an approach to anomaly identification which is computationally tractable in real-time and which provides reliable identification of anomalous states of a system.

A first aspect of the invention provides a method for identifying an anomalous state of a system. The method can comprise receiving a current data item of a data set relating to a property of the system. An estimate of a current data density can be recursively calculated using the current data item. At least one statistical property of the estimate of the current data density can be recursively calculated. From the at least one statistical property it can be determined whether the current data item indicates an anomalous state of the system.

Hence, as the method uses recursive calculations the computational burden is very low. The recursive calculations use only a current data item and stored data which summarise, in a statistical way, the past operation of the system. Hence, the method does not need to process all, or a large number of, past or historical data items.

The method can be a real-time method. The system can include at least one sensor outputting time series data items which comprise the data set. The method can comprise receiving a current data item from the sensor. An estimate of a current data density for the time series data items can be recursively calculated using the current data item. A signal can be output if it is determined that the current data item indicates an anomalous state of the system.

The computational burden can be sufficiently low that the method can operate in real-time, even for complicated systems having hundreds or even thousands of different sensor outputs to be processed.

The method can be applied to systems including a plurality of sensors each outputting time series data. The streams of time series data can each relate to a different property of the system.

A plurality of statistical properties can be recursively calculated. The plurality of statistical properties can include the current mean of the current data density and the current variance of the current data density.

The current data item can be determined to indicate an anomalous state based on the degree of difference between the estimate of the current data density and the current mean of the current data density.

The current data item can be determined to indicate an anomalous state if the difference between the estimate of the current data density and the current mean of the current data density is greater than a number of standard deviations of the current mean of the current data density, for example one, two or preferably three standard deviations.

The method can further comprise applying a further test or a plurality of further tests to determine whether the current data item indicates an anomalous state. The further test or tests can be selected from: a temporal based test; and an event based test. The temporal based test can determine whether a potentially identified anomalous state has occurred within a specific time period since a previous potentially identified anomalous state. The event based test can determine whether a potentially identified anomalous state has occurred within a specific sequence or order relative to a previous potentially identified anomalous state.

The method can further comprise: recursively calculating a mean value of the data item using the current data item; and/or recursively calculating a scalar product of the data item on or with itself.

The method can further comprise: using the mean value of the data item and the scalar product of the data item to recursively calculate the estimate of the current data density.

The system can include a plurality of sensors each outputting time series data items relating to a different property of the system. The method can be applied to current data items respectively received from each of the plurality of sensors.

Determining can comprise determining from the at least one statistical property whether a subset of current data items of the plurality of data items indicate an anomalous state of the system.

Determining can comprise determining from the at least one statistical property whether all current data items of the plurality of data items indicate an anomalous state of the system.

The method can include outputting a variety of different kinds of signal. The signal can encode or correspond to a command and/or data. The signal can be selected from: a data signal; a control signal; a feedback signal; an alarm signal; a command signal; a warning signal; an alert signal; a servo signal; a trigger signal; a data capture signal; and a data acquisition signal.

The system can be a video system. An anomalous state of the video system can correspond to detecting a new object or a change in an object within the field of view of the video system.

The sensor can be an image sensor. The time series data can be color video data, such as a red, green and blue video data, or grey or greyscale image data.

The property can be a sub-region of a frame of video data. Each sub-region or bin of a frame of video data can be analysed separately to identify anomalous states of the video system.

A second aspect of the invention provides a data processing apparatus for identifying an anomalous state of a system in real time. The apparatus can comprise a data processing device and a storage device in communication with the data processing device. The storage device can store computer program code executable by the data processing device to carry out the method aspect of the invention and any of the preferred features of the method.

A third aspect of the invention provides a system, the system comprising: at least one operative part; at least one sensor for measuring a property of the operative part; and a data processing apparatus according to the preceding aspect of the invention. The data processing apparatus can be in communication with the sensor to receive time series data from the sensor.

The system can be any industrial, electrical or an electromechanical system. The system can be a machine, an apparatus, a vehicle, an engine, a plant, a piece of plant, a piece of machinery, an electrical or electronic device or similar.

The data processing apparatus can have an output which is in communication with the system to output the signal to the system. Hence, the data processing apparatus can be used to issue a signal to another part of the system which is external to the data processing apparatus itself. The output can be in communication with the operative part of the system, for example, so as to allow control thereof. The output can be in communication with another operative part or a sub-system of the system. The data processing apparatus can have a plurality of outputs each being in communication with a different part of the system.

A fourth aspect of the invention provides computer readable medium storing computer program code executable by a data processing device to carry out the method aspect of the invention and any of the preferred features of the method.

Embodiments of the invention will now be described in detail, by way of example only, and with reference to the accompanying drawings, in which:

FIG. 3 shows a graphical representation of a data structure used by the first embodiment of the invention;

FIG. 10 shows a flow chart illustrating a data processing method of the second embodiment of the invention;

Figure 1:
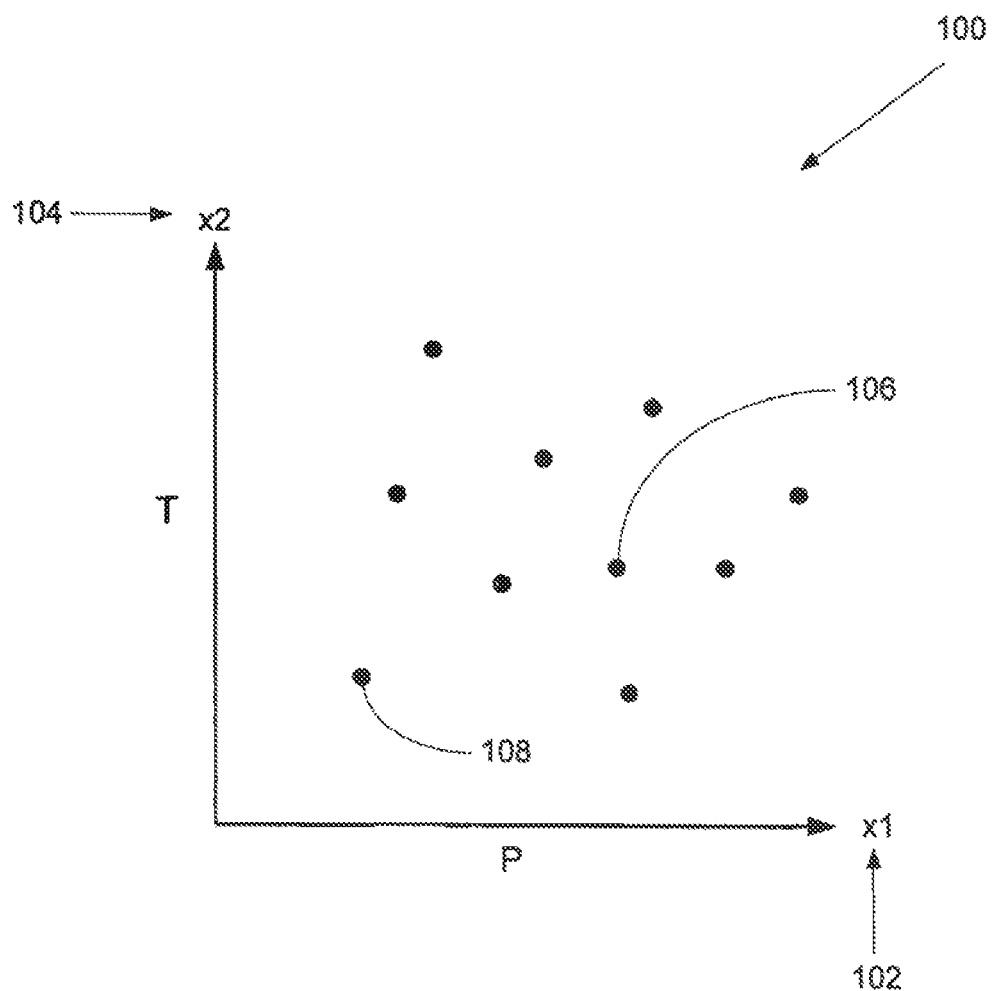
FIG. 1 shows a graphical representation of data points in a two-dimensional data space.

Similar items in different Figures share common reference signs unless indicated otherwise.

There are a wide variety of systems in which the present invention can be used. By way of example only, two embodiments of the invention are described below in the context of an aircraft control system (such as an Aircraft Condition Monitoring System or ACMS) and a video capture system. However, it will be appreciated that the invention can be applied to other types of system both more and less complex, and in a wide variety of fields of industry.

The invention is particularly concerned with identifying anomalous behavior in a system in real-time and based on processing data obtained from one or more sensors which measure one or more properties of the system. The invention can give rise to various different types of output signals as a result of identifying or detecting anomalous behavior. Hence, the invention generally falls within the field of condition responsive technologies. The invention has a low computational burden and so can identify or detect anomalies in real-time. The invention is computationally highly efficient as the N+1th state of a system is calculated from the N+1th point and data describing the Nth state of the system only, with no need for calculation using all the previous N data points individually. This makes the technique particularly suited for real-time applications.

An adaptive mechanism is provided which can identify novel conditions in complex systems. Depending on the nature of the system and the anomalous behavior, the identified novel condition might be a fault or a trigger for some secondary action, such as data recording. Importantly no a priori knowledge of the system is required. There is no need for knowledge of ranges of sensor data, operating limits for sensor data or the meaning of sensor data. Rather, after a period of unsupervised learning (either in real-time, or having been fed captured historical data) an image or model of "normal" behavior of the system is built based on the statistical properties of the data.

This "normal" behavior may include multiple normal operating modes, and these modes are automatically discovered. For example the sensor data from an aircraft will take different normal values depending on the phase of the flight (e.g. take off, cruising and landing) and each phase of flight may have its own normal mode which is different to the respective normal modes of the other phases of flight. Some form of signal can be generated when anomalous behavior is detected, which, for example, may indicate an alarm state or be a trigger signal, when sensor data falls sufficiently statistically outside one of the learned normal operating modes.

Before describing embodiments of the invention in greater detail, the mathematical basis for the method of the invention will be discussed. As mentioned above, the method is a recursive method which uses data summarising the previous state of the system together with input data from one or more sensors for the current state of the system.

The method of the invention uses data density, D, and not a probability density function (pdf), p which is very similar. However, data density, D, and pdf, p, differ because while both satisfy the condition:

$$0 \leq D \leq 1; \quad 0 \leq p < 1 \qquad (1)$$

data density does not satisfy the condition:

$$\int_{-\infty}^{\infty} p(.) = 1 \qquad (2)$$

Instead, $\max_x D = 1$; $\max_x p < 1$

Data density can be defined as the inverse of the sum of the total distances between all data points or sample. The specific function or kernel of the data density can be, for example, of Cauchy type because it is convenient for recursive calculations:

$$D(x_k) = \frac{1}{1 + \frac{1}{k}\sum_{i=1}^{k} \|x_k - x_i\|^2} \qquad (3)$$

Where D denotes the global data density at the data sample $x_k$ and where k is the current time instant or data sample index. Other functions such as Gaussian, Epanechnikov, etc. are also possible, but they are more difficult to calculate recursively.

FIG. 1 shows a graphical representation 100 of a two-dimensional data space, in which the first data type 102, x1, is the pressure of a system at instant k and the second data type 104, x2, is the temperature of the system at instant k. It will be appreciated that a system may have fewer or more dimensions of data (i.e. anywhere from 1 upward, for example thousands or more). However, FIG. 1 illustrates, for a two data dimension system, the state (in terms of temperature and pressure) for ten states of the system (k=1 to 10). Point 106 represents the ninth state of the system (i.e. k=9) having a high data density (i.e. being close to many other data points of the system) and point 108 represents the tenth state of the system (i.e. k=10) having a low data density (i.e. being far from many other data points of the system).

Local density (i.e. in terms of clusters of data points rather than globally in terms of all the data points) can be introduced in a similar way:

$$d^j(x_k) = \frac{1}{1 + \frac{1}{M}\sum_{i=1}^{M_j} \|x_k - x_i\|^2} \qquad j = [1, N] \qquad (4)$$

Where d denotes the local density at the data sample $x_k$, $M_j$ is the number of data samples associated with a particular cluster and N is the number of clusters.

Both, global and local density can be estimated recursively leading to the concept of recursive density estimation (RDE):

$$D(x_k) = \frac{1}{1 + \|x_k - \mu_k\|^2 + \Sigma_k - \|\mu_k\|^2} \qquad (5)$$

where $\mu$ denotes the mean and $\Sigma$ denotes a scalar product of all data samples, if a global density, D, is used. If local density, d, is being computed, then $\mu$ denotes the mean and $\Sigma$ denotes a scalar product of data from a cluster.

The recursive data estimation (RDE) of equation (5) can be derived from equation (3) in the following way. From equation (3) or (4):

$$D(x_k) = \frac{1}{1 + x_k^2 - 2x_k \frac{1}{k}\sum_{i=1}^{k} x_i + \frac{1}{k}\sum_{i=1}^{k} x_i^2} \qquad (6)$$

Regrouping equation (6):

$$D(x_k) = \frac{1}{1 + x_k^2 - 2x_k \frac{1}{k}\sum_{i=1}^{k} x_i + \left(\frac{1}{k}\sum_{i=1}^{k} x_i\right)^2 - \left(\frac{1}{k}\sum_{i=1}^{k} x_i\right)^2 + \frac{1}{k}\sum_{i=1}^{k} x_i^2} \qquad (7)$$

$$D(x_k) = \frac{1}{1 + \left\|x_k - \frac{1}{k}\sum_{i=1}^{k} x_i\right\|^2 + \frac{1}{k}\sum_{i=1}^{k} x_i^2 - \left(\frac{1}{k}\sum_{i=1}^{k} x_i\right)^2} \qquad (8)$$

The recursively updated mean, $\mu$ and scalar product, $\Sigma$, are introduced as follows:

$$\mu_k = \frac{k-1}{k}\mu_{k-1} + \frac{1}{k}x_k \quad \mu_1 = x_1 \qquad (9)$$

$$\Sigma_k = \frac{k-1}{k}\Sigma_{k-1} + \frac{1}{k}\|x_k\|^2 \quad \Sigma = \|x_1\|^2 \qquad (10)$$

and equations (8) to (10) lead to equation (5).
Similarly, the local (per cluster) RDE is given by:

$$d^j(x_k) = \frac{1}{1 + \|x_k - \mu_k^j\|^2 + \Sigma_k - \|\mu_k^j\|^2} \quad j = [1, N] \qquad (11)$$

Based on the value of the data density calculated using the RDE equations a simple, yet efficient outlier anomaly detection method is possible. Taking the global case as an example, the data density, $D(x_k)$, is calculated in real time per data sample. The mean data density, $\overline{D}(x_k)$ is given by:

$$\overline{D}(x_k) = \frac{1}{k}\sum_{i=1}^{k} D(x_k) \qquad (12)$$

and can also be calculated in real-time (using the notation $\overline{D}_k$ instead of $\overline{D}_k(x_k)$) as:

$$\overline{D}_k = \frac{k-1}{k}\overline{D}_{k-1} + \frac{1}{k}D_k \quad \overline{D}_1 = D_1 \qquad (13)$$

The variance of the data density (not of the original data, x):

$$\sigma_k^2 = \|\overline{D}_k - D_k\|^2 \qquad (14)$$

can also be calculated recursively using:

$$\sigma_k^2 = \frac{k-1}{k}\sigma_{k-1}^2 + \frac{1}{k}(D_k - \overline{D}_k)^2 \quad \sigma_1^2 = 1 \qquad (15)$$

where the summation is for the k-th element only.

Using equations (13) and (15), outlier or anomalous data can be identified or detected using some statistical based rule or threshold. For example, a data point which is greater than, for example, two or three standard deviations ($\sigma_k$) away from the mean of the data density, $\overline{D}_k$, can be identified as an anomaly. Three standard deviations is preferred as, for a Gaussian data distribution, 99% of the data (and greater than 8/9$^{th}$ of the data for a arbitrary distribution) will be less than three standard deviations from the mean.

The mean and the standard deviation can be determined for each data dimension of a system separately, e.g. for temperature and pressure in the above example. An outlier can then be identified if the pressure standard deviation is more than three standard deviations from the mean of the pressure data density or similarly for temperature. This can provide a useful insight into the specific cause of the fault or problem. Additionally or alternatively the mean and the data density can be calculated using the whole group of data dimensions and outliers identified globally for the system as a whole. This can provide a better global or big picture view of the performance of the system.

Additionally or alternatively means and standard deviations can be determined for one or a plurality of sub-groups of data dimensions within the group of all data dimensions for a system. In this case an estimate of local data density (d see equation (11) above) is used and can be determined using the following equations:

$$\overline{d}^j(x_k) = \frac{1}{M_j} \sum_{i=1}^{M_j} d^j(x_k) \quad (16)$$

$$\overline{d}_k^j = \frac{M_j - 1}{M_j} \overline{d}_{k-1}^j + \frac{1}{M_j} d_k^j \quad \overline{d}_1^j = d_1^j \quad (17)$$

$$(\sigma_{M_j}^j)^2 = \|\overline{d}_k^j - d_k^j\|^2 \quad (18)$$

$$(\sigma_{M_j}^j)^2 = \frac{M_j - 1}{M_j}(\sigma_{M_j-1}^j)^2 + \frac{1}{M_j}(\overline{d}_k^j - d_k^j) \quad (\sigma_1^j)^2 = 1 \quad (19)$$

Where $M_j$ is the number of data items associated with the jth sub-group.

Having described the mathematical basis of the method of the invention, two different example systems embodying the invention will now be described.

Figure 2:
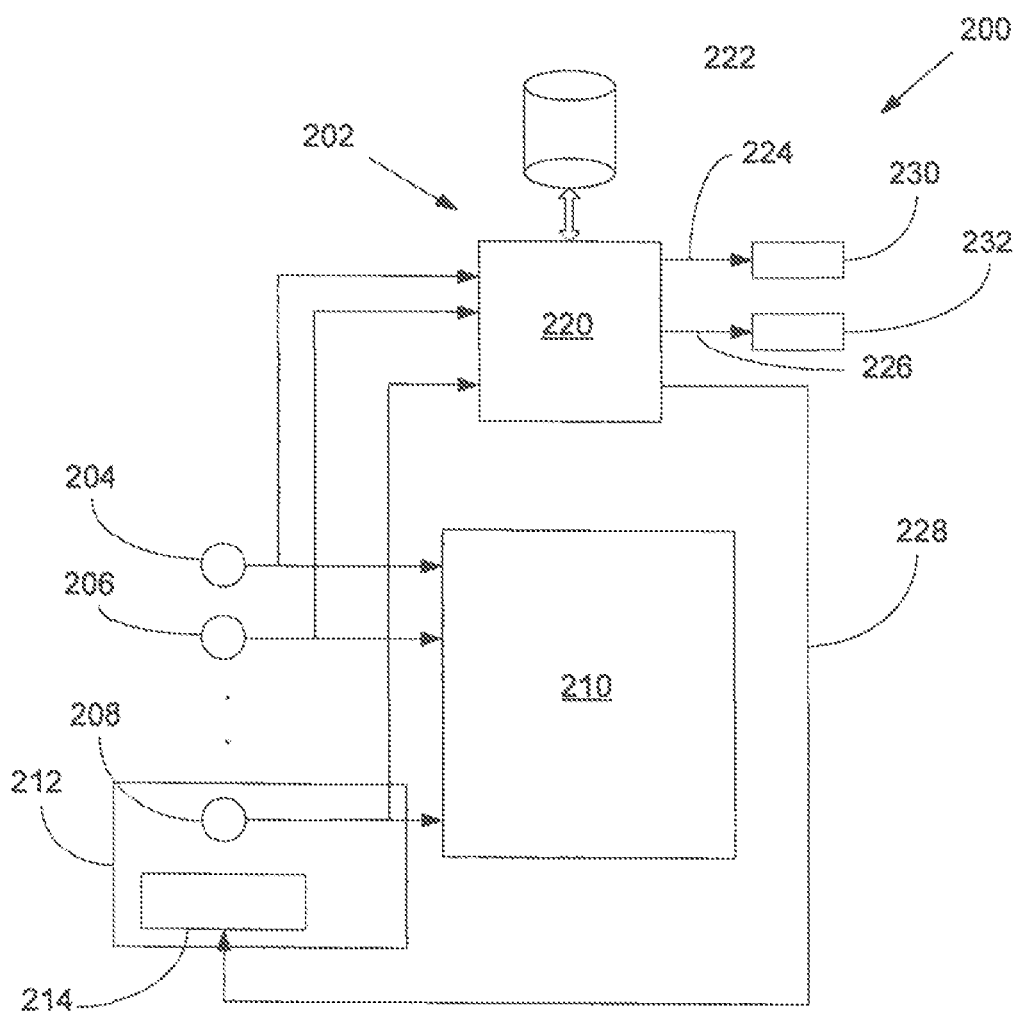
FIG. 2 shows a schematic block diagram of an aircraft control system according to the invention and including a data processing apparatus according to a first embodiment of the invention.

With reference to FIG. 2 there is shown a schematic block diagram of a first embodiment of a system 200 according to the invention including a data processing apparatus 202 also according to the invention. The system 200 is a part of an aeroplane and includes a plurality of sensors 204, 206, 208 each measuring a property of the aircraft. The sensors 204, 206, 208 output data which is communicated to a flight data recorder 210 also known colloquially as a "black box" data recorder. The third sensor 208 is provided as part of a sub-system 212 of the aircraft. The sub-system can include multiple components, such as a servo 214. For example, the sub-system 212 can be a part of the flight control sub-system of the aircraft and servo 214 can be operable to adjust the wing flaps of the aircraft. Although three sensors are illustrated in FIG. 2, it will be appreciated that a far greater number of sensors will be provided in practice. For example, a typical commercial aircraft may have anywhere in the region of two to three thousand different sensors.

The data processing apparatus 202 includes a data processing unit 220 including one or more central processing units, local memory and other hardware as typically found in a conventional electronic general purpose programmable computer. The data processing unit 220 is in communication with a data store 222 which may be in the form of a database. Data processing unit 220 has a plurality of outputs 224, 226, 228. A first output 224 is in communication with a further part of the system 200, such as a display unit 230 in the cockpit of the aircraft. The system 200 may include a further part 232, such as a further computing or data processing device to which an output signal can be supplied by the data processing unit 220. Finally, a third output 228 is in communication with sub-system 212 and in particular allows a signal path to wing servo 214. Hence, the data processing unit 220 may output various different signals to different parts of the system in order to control or otherwise interact with other parts of the system 200.

Data processing unit 220 locally stores computer program code to implement a data processing method also according to an aspect of the invention and which will be described in greater detail below. For example, the computer program code may be stored in compiled form in a local ROM. A local RAM is also provided to provide working memory and storage for the data processing unit in order to execute the computer program instructions.

Figure 3:
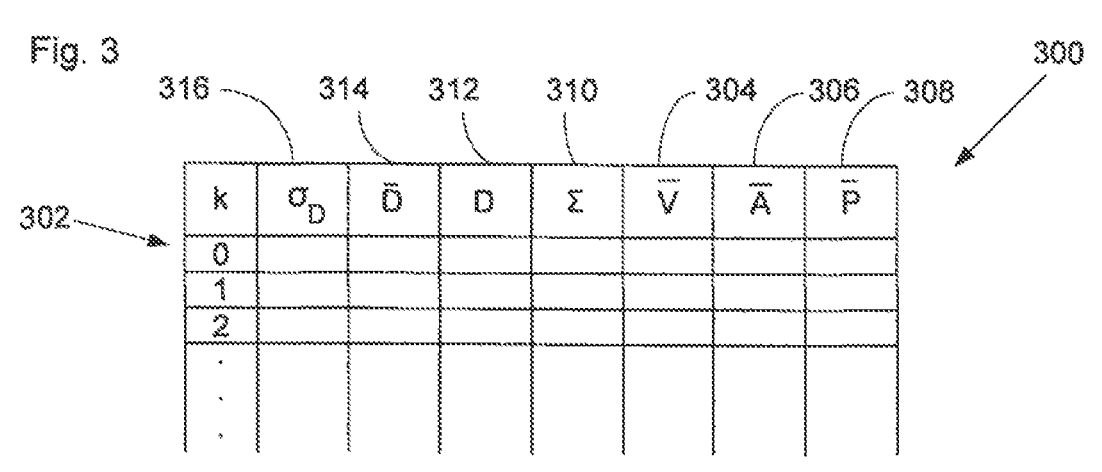
Figure 4:
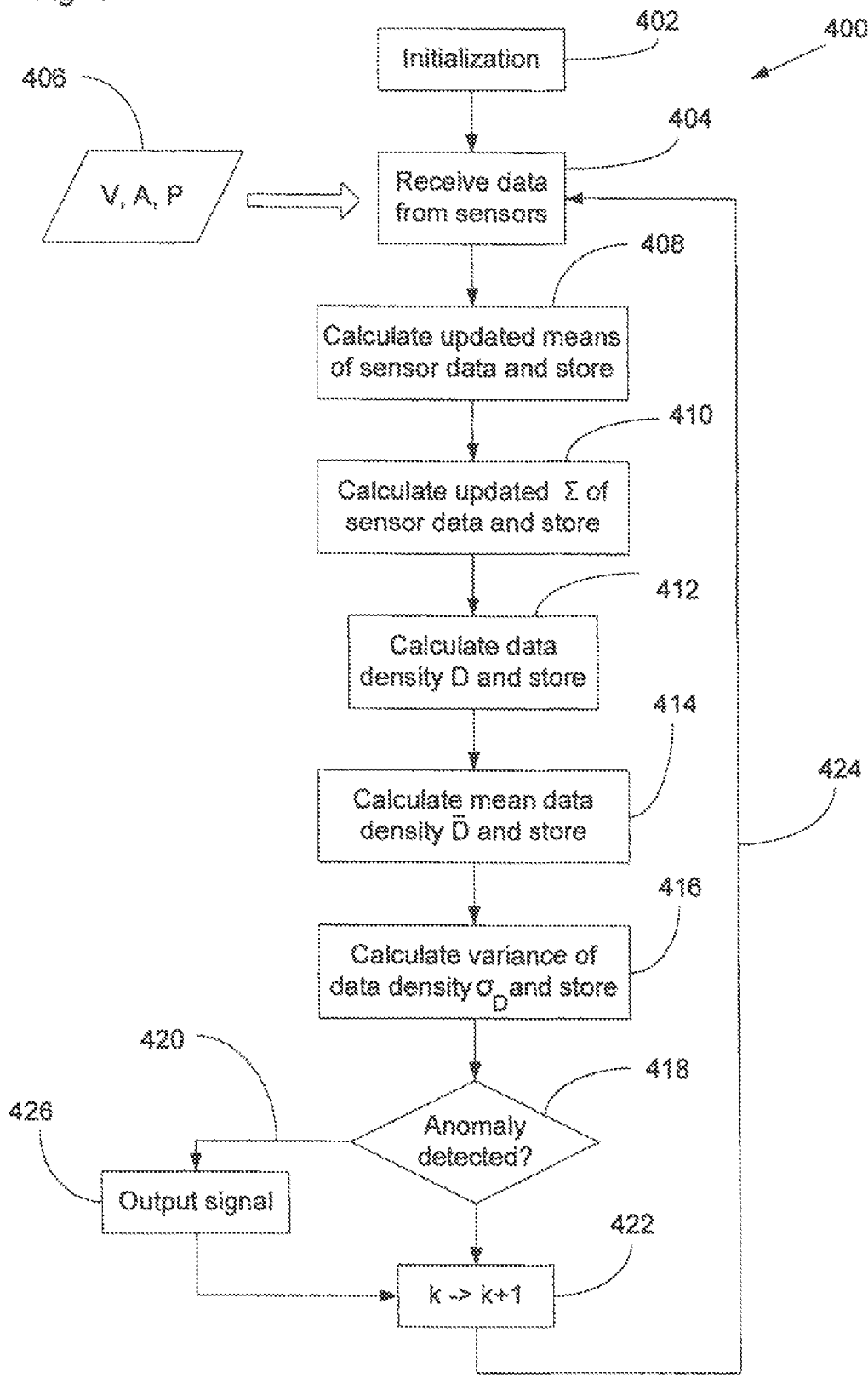
FIG. 4 shows a flow chart illustrating a data processing method of the first embodiment of the invention.

FIG. 3 illustrates a data structure 300, in the form of a table, which stores various data items used by the data processing method illustrated in FIG. 4. The data structure 300 includes a plurality of rows, e.g. row 302, each row corresponding to a time step (indexed k) at which a current data point is received by the data processing unit 220 from sensors 204, 206 and 208. The data structure provides fields for storing calculated values of the mean of different properties of the aircraft detected by the sensor, such as velocity (V) 304, altitude (A) 306 and pitch (P) 308. The table also has fields for storing data items representing the recursively calculated values of the scalar product of the data item on itself 310, a recursively estimated data density value 312, a mean data density value 314 and a data density standard deviation 316. The calculation of these data items is described in greater detail below. In an embodiment in which anomaly detection is done on a data dimension by data dimension basis, then table 300 stores the statistical data items 316, 314, 312 and 310 for each data dimension, e.g., for each of V, A and P.

FIG. 4 shows a flow chart illustrating an anomaly identification or detection data processing method 400. Method 400 begins at step 402 with initialisation of the software and before receipt of any data items from the sensors, at k=0. At step 404, a first set of data values 406 are received by the data processing unit from sensors 204 to 208 at k=1. In the illustrated example, the data provided by the sensors relate to the properties of the velocity, altitude and pitch of the aircraft. At step 408, a mean value of the sensor data is recursively updated using equation 9 for each data item and stored in fields 304, 306 and 308 respectively of table 300. It will be appreciated that for the first data item, k=1, the mean is simply set to the first data value. Then at step 410, the scalar product is recursively calculated using equation 10 for each of V, A and P and stored in field 310 of table 300. In other embodiments, the covariance, and the other statistical data can be calculated on a system wide basis for the entire group of parameters of the system or for a sub-system of parameters. As will be appreciated, for the first data point, k=1, the covariance is set to the square of the first data point, as indicated in equation 10 above.

Then at step 412, the data density is recursively estimated using equation 11. Therefore, at step 412, the data density 312 is recursively estimated for each of velocity, altitude and pitch using the respective scalar product and mean values stored in table 300 and is written to field 312.

Then, at step 414, the mean data density is recursively calculated using equation 13 and the results stored in field 314. As indicated in equation 13, for the first data item, k=1, the mean data density 314 is simply set to the estimated data density 312. Then at step 416, the variance of the data density is recursively calculated using equation 15 and the standard deviation (square root of the variance) is stored in field 316 of table 300. As indicated by equation 15, for the first data item, k=1, the variance is set equal to 1. At step 418, a number of tests can be applied using the recursively calculated statistical data stored in table 300 to determine whether an anomalous state of the system has been identified or detected. Where there is only a single data point present, no anomalous behavior can be identified and therefore processing proceeds to step 422 at which the data index k is incremented and processing returns, as illustrated by process flow line 424, to step 404 at which a next set of data are received from the sensors.

Processing then proceeds as described above, for k=2. However, as will be appreciated from the form of the equations described above, each of the statistical data items is calculated recursively, that is using only the data items stored in the table for the preceding data point (in this case k=1) and not using all of the data points previously received from the sensors. Hence, for example, for the 1001st set of data (k=1001) the statistical data items stored in table 300 for the 1000th data set (k=1000), and not all 1000 preceding sets of data points, are used together with the 1001st set of data items in order to determine the standard deviation 316, mean data density 314, and data density 312 on the basis of which anomaly identification is carried out at step 418. Hence, the method is computationally light and can be conducted in real time.

Figure 5:
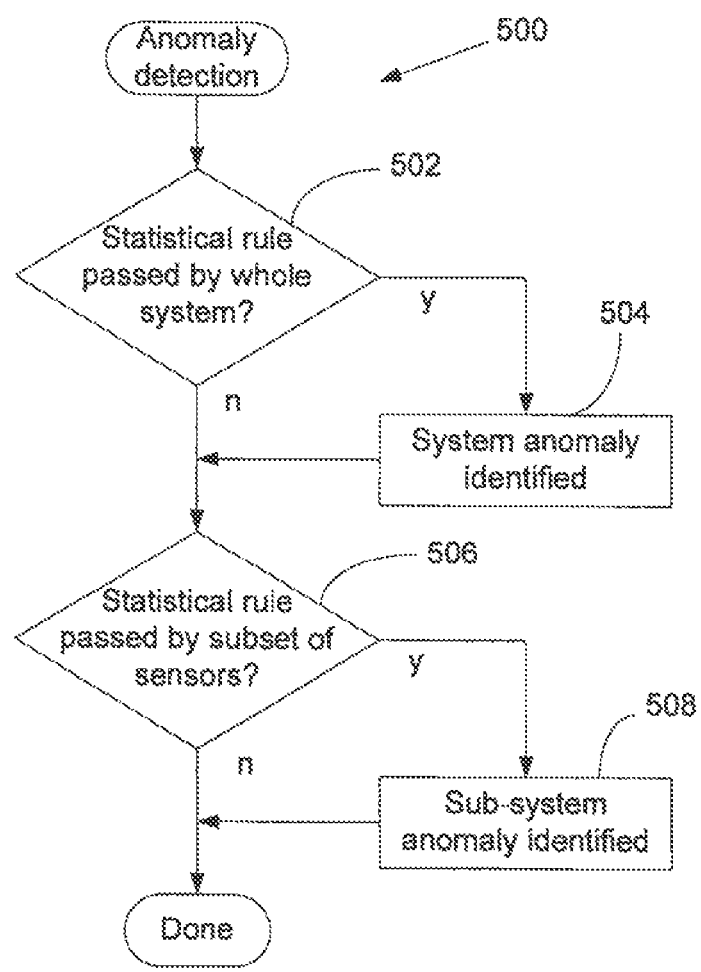
FIG. 5 shows a process flow chart illustrating an anomaly detection step of the method illustrated in FIG. 4 in greater detail.

FIG. 5 shows a flow chart illustrating an anomaly detection data processing method 500, corresponding generally to step 418, in greater detail. Anomaly detection method 500 includes a first test 502 at which it is determined whether the system overall is considered to be exhibiting anomalous behavior by assessing the data from all of the sensors. For example, a single statistical rule may be applied to the data from all of the sensors. For example, the rule may be that an anomaly is identified if the data density differs from the mean data density by more than three standard deviations.

Figure 6:
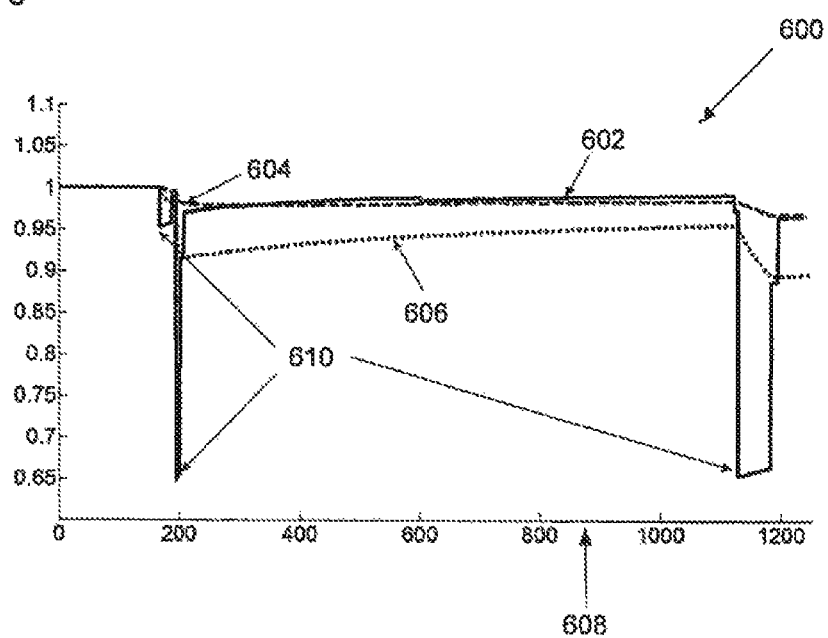
FIG. 6 shows a graphical representation of the detection of anomalies according to the method of the first embodiment.

FIG. 6 illustrates this statistical rule. FIG. 6 shows a graphical representation 600 of the plot of data density D 602, the mean data density $\overline{D}$ 604, and $\overline{D}$ minus three standard deviations, 606, as a function of data index k 608. Taking, for example, the data to be the plane velocity, V, then it can be seen that for data samples at k of approximately 180, 190 and 1150, the data density of the velocity 602 is more than three standard deviations away from the mean data density 604 and therefore three anomalous conditions 610 have been identified. Elsewhere, the data density 602 is less than three standard deviations from the mean data density 604 and therefore no anomalous state is identified to exist.

Hence, at step 502, the statistical test of whether the mean value for the current data point for the whole system is within three standard deviations of the mean data density is applied to each data item. If the average value for each data item does exceed three standard deviations from the mean data density, then an anomalous state of the system as a whole is identified at step 502 and processing proceeds to step 504 at which the data processing apparatus flags the state of the system as being anomalous operation.

Irrespective of whether an anomalous state is identified for the system as a whole at step 502, processing proceeds to step 506 at which a test can be applied to a sub-set of the sensors (i.e. to fewer than all of the sensors) in order to detect anomalous behavior of a part or sub-system of the system. For example, it might be that one particular sensor, or group of sensors, is particularly sensitive to identifying potentially anomalous behavior. A different statistical test may be applied to the one or group of sensors in order to identify anomalous behavior. For example, at step 506, a statistical test of whether the mean value of altitude is more than three standard deviations from the mean data density for altitude may be applied only to the altitude data item. For example, during a cruising mode of flight, a sudden change in altitude may be seen as a significant anomalous operation of an aircraft. Hence, at 506, a different statistical rule is applied to a subset of sensor data in order to identify anomalous behavior. If the mean value of altitude is determined to be more than three standard deviations away from the mean data density at step 506, then a different anomaly is identified at step 508. Processing proceeds to the end of method 500, with any system and/or sub-system anomalies having been identified, and processing returns to the main routine 400.

If at step 420, an anomaly is considered to be identified then the data processing unit 230 can output one or more signals at step 426. A variety of different output signals may be issued by data processing unit 220. For example, a control signal may be issued in order to control a part of sub-system of the overall system. For example, a control signal may be issued along line 228 to servo 214 in order to change the angle of the wing flaps in response to the detection of an anomalous operating condition. As well as control signals, data processing at 220 may output an alert or alarm signal. For example, an alarm signal may be output along line 224 to display unit 230 so as to operate a visual alarm in the cockpit to highlight to the pilot, on the instrumentation panel, the existence of an anomalous condition. Additionally, or alternatively, a control or command signal may be issued in order to instruct a further part of the system to carry out some operation. For example, a command signal may be issued along line 236 to a further data processing device 232 to carry out further data processing or to start the collection and/or analysis of further data. Hence, a wide variety of different types of signals can be output by data processing unit 220 dependent on the nature of the anomalous condition identified and what remediative or other action may be required.

Figure 7:
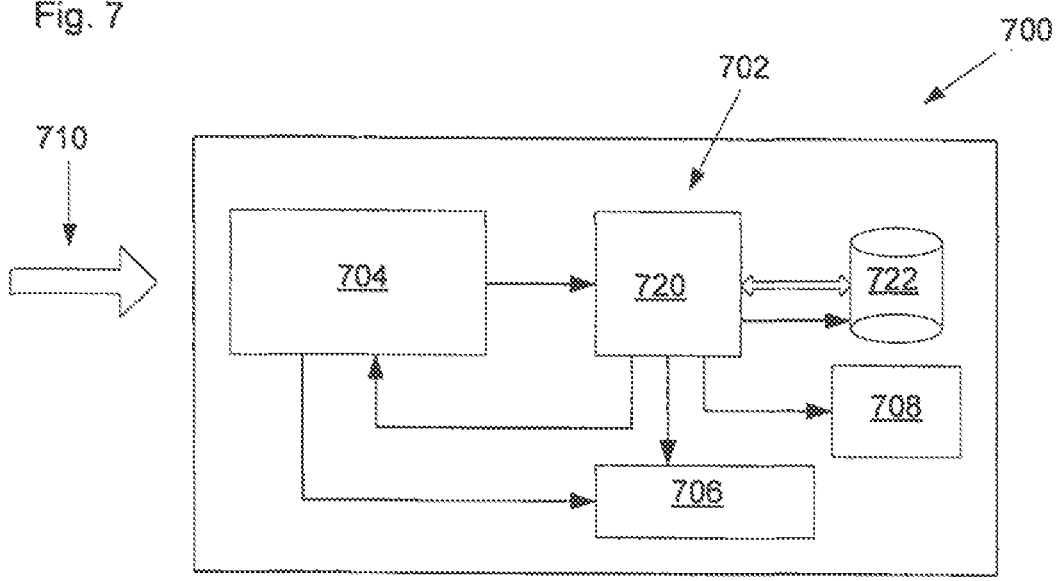
FIG. 7 shows a schematic block diagram of a video system according to the invention and including a data processing apparatus according to a second embodiment of the invention.

With reference to FIG. 7 there is shown a second embodiment of a system 700 in the form of a video system, in which the invention can be used. Video system 700 includes a data processing apparatus 702 including a data processing apparatus 720 and data storage device 722 similar to that described previously. Video system 700 also includes a video image capture device 704 and a video data storage device 706 for permanently storing video data captured by video capture device 704. The video capture device 704 may be in the form of a charge coupled device and may include optical elements for capturing incoming images 710 and generating frames of video data which are stored in video data store 706. The video system 700 may include further parts, components or sub-systems, as illustrated by part 708.

Video capture device 704 captures sequential frames of video data comprising a plurality of pixels, each pixel having a red, green and blue data value. As an alternative to R,G,B it is also possible to use H, S, V (hue, saturation and value of brightness respectively) and which can be derived from the same image frame and pixels/bins. This effectively captures the same information but can be more robust in some applications.

Figure 8:
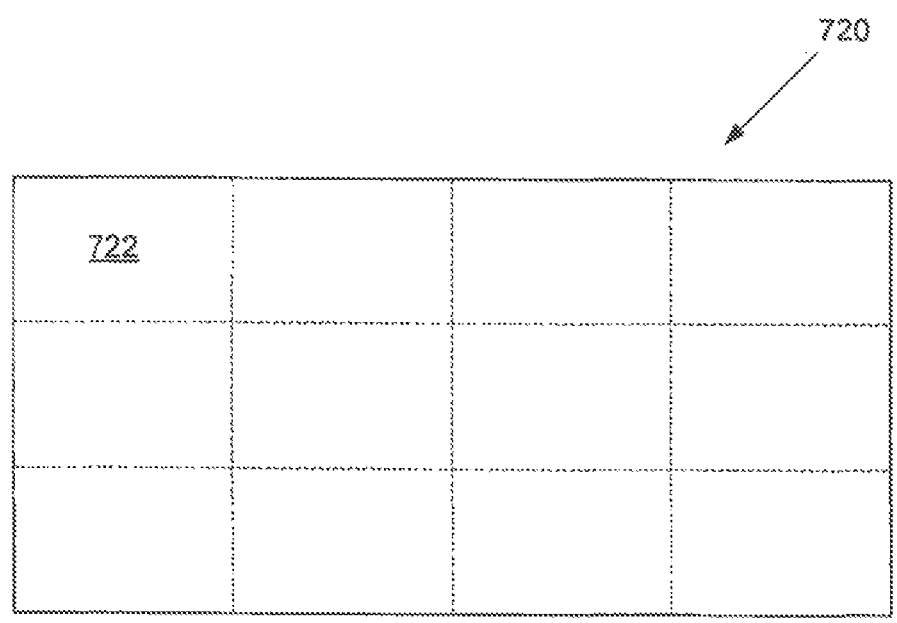
FIG. 8 shows a graphical representation of frame of video data being composed of a plurality of video data bins.

For example, FIG. 8 illustrates a frame of video data 720 comprising a plurality of rows and columns of pixels. The frame of video data 720 is split into twelve sub-regions, or bins, arranged in a 3×4 array. In other embodiments, a greater (e.g. 16 or 24) or a lesser (e.g. nine) number of sub-regions can be used, as well as other arrangements of sub-regions. A first bin 722 is illustrated, as an example only, in the top left hand region of image frame 720. Other binning arrangements are possible, for example a 3×3 array. It has been found that separating an image frame into sub-regions improves the identification of anomalous events in captured image data as will be described in greater detail below. In some embodiments, the anomalous event can be a specific type of landmark.

Figures 9, 11:
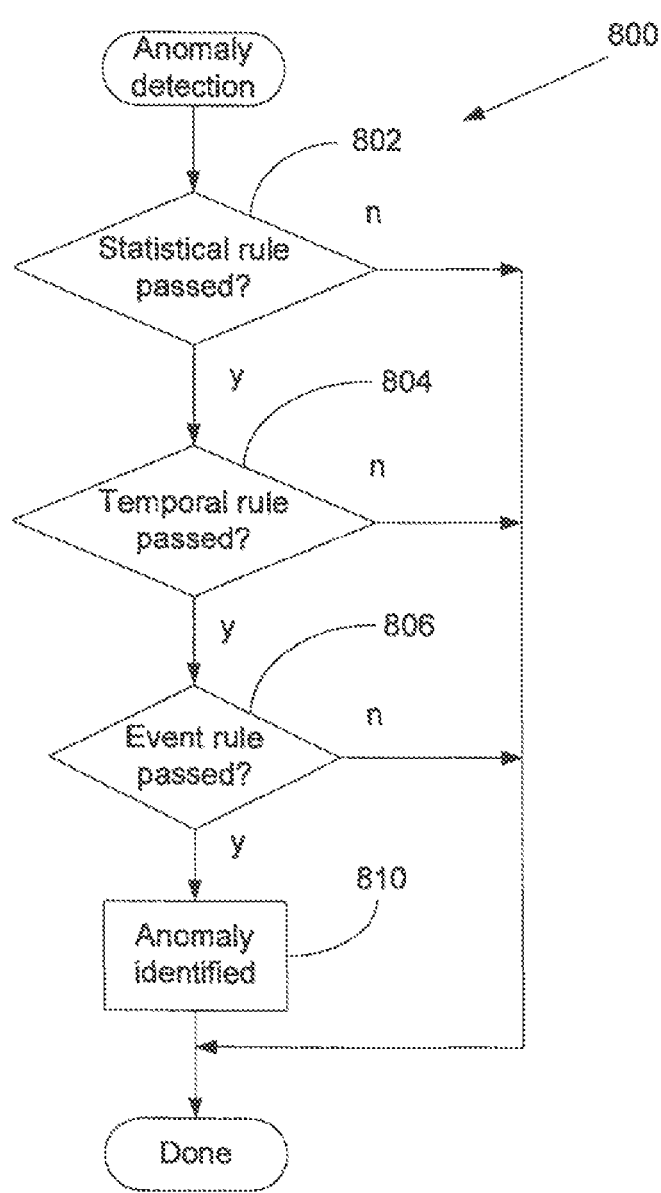
FIG. 9 shows a graphical representation of a data structure used by the second embodiment of the invention.
FIG. 11 shows a process flow chart illustrating an anomaly detection step of the method illustrated in FIG. 10 in greater detail.

FIG. 9 shows a data structure 730 similar to that illustrated in FIG. 3. However, in data structure 730, the average sensor data values 732, 734, 736 are for the red, green and blue color data items for the images captured by the video system 700. In other embodiments data items for Hue, Saturation and Value of brightness can be used, as discussed above. In this described embodiment, the sensor can be considered to be the CCD or other imaging sensor used by the video capture component 704. Further, data structure 730 can be considered to be schematic in that each bin of the image has its own set of data items. That is, each bin of the image frame is considered an independent entity, for anomalous event detection. Therefore, a frame of video data, in the current example, comprises twelve entities each having their own RGB and statistical data values. Hence, data structure 730 effectively stores twelve sets of the specific data items illustrated in FIG. 9. Further, the statistical data items are calculated and stored separately for each of the R, G and B data items. Hence, there are three values each of the scalar product 738, data density estimate 740, mean data density 742 and standard deviation 744, one for each of R, G and B.

FIG. 10 shows a flow chart illustrating a data processing anomaly detection method 750 according to a second embodiment of the invention. Method 750 is similar to method 400 and differences will be highlighted below in the context of the video system 700. In the context of the video system 700, anomalous behavior can be considered to be equivalent to the detection of novelty in the video images, for example a new entity appearing in a video image which was not previously present. Taking, as a practical example, if the video system is capturing images of a street, then an anomalous event may be the appearance of a car in the video image which was not previously present.

The method initialised at step 752 and at step 754, the data processing unit 720 receives a frame of video data 756 from the video capture device 704. A first bin, e.g. bin 722, is selected and for the pixels of the first bin. A mean value of the R, G and B data for all pixels within the currently selected bin is recursively calculated and stored in table 730. Then at steps 760 to 766, the scalar product, data density, mean data density and data density variance 738, 740, 742, 744 are each recursively calculated and stored in table 730. Then at step 768, an anomaly detection routine is applied using the statistical data stored in table 730 in order to identify any anomalous behavior in the current bin. If any anomalous behavior is determined to have been detected at step 768, then processing proceeds to step 770 at which the data processing unit 720 can output a signal. If no anomaly is detected at step 768, then processing proceeds to 772, and process flow returns, as illustrated by line 774, to step 758 at which a next bin of the image frame is processed. Processing proceeds as described above for the next bin and processing continues to loop until all bins of the current frame have been processed. Then at step 776, a next image frame is selected for processing and processing returns, as illustrated by processing return line 778 to step 754 at which a next frame of the image data is received by data processing unit 720 from image capture device 704.

Applying anomaly detection on a bin by bin, rather than frame by frame, basis, has been found to improve anomaly detection in images. If average R, G and B values are used for entire frame of image data, then the R, G and B values averaged over the entire image frame tends to wash out local variations. For example, taking the frame as a whole, if a red car were to enter the image frame from the bottom right hand corner, then the average red value over the entire frame may not change much. However, the average red value for the bottom right hand bin would change significantly. It has been found that by breaking the image frame down into sub-regions such that each sub-region has a size corresponding to a typical size of an entity within the image, this improves anomaly detection.

FIG. 11 shows a process flow chart illustrating an anomaly detection data processing method 800, corresponding generally to step 768 of FIG. 10. As illustrated in FIG. 11, the anomaly detection method 800, includes a multi-rule approach to anomaly identification. Firstly, a statistical rule is applied at step 802, if the statistical rule is not passed so as to identify an anomaly, then processing ends. Otherwise, processing proceeds to the second rule 804 which is based on a temporal test. If the temporal rule is not passed, then no anomaly is identified and processing terminates. If the temporal rule is passed to indicate a potential anomaly, then processing proceeds to step 806 at which an event based rule is applied. If the event based rule is not passed, then processing terminates. Otherwise, processing proceeds to step 810 at which an anomaly can be considered to have been reliably identified.

In greater detail, the statistical rule applied at step 802 may be similar to that used for the aircraft embodiment. That is, the statistical rule may be whether, for the current bin, the data density for all three colors differs from the mean data density for all three colors by more than three standard deviations. If not, then no anomaly may potentially be identified.

The values for all colors of the color channels (e.g. RGB or HSV) are summed together using Euclidean distance as follows:

$$D(x_k) = \frac{1}{1 + \frac{1}{k}\sum_{i=1}^{k} \|x_k - x_i\|^2} = \frac{1}{1 + \frac{1}{k}\sum_{j=1}^{n} (x_{kj} - x_{ij})^2} \quad (20)$$

At step 804, the temporal rule applies the test of whether the potential anomaly is more likely to be noise or a genuine change in the image being captured. For example, in a typical street scene, a car may move at approximately 30 mph, and therefore an anomaly corresponding to a car entering the field of view of the image would be expected to occur over a large number of consecutive frames owing to the sampling interval of the video camera. That is, an image anomaly equivalent to a car would likely to be present in the same bin for multiple consecutive samples. However, if the image anomaly were present in a bin of a first sample but absent from a second sample, that change would be inconsistent with the speed a car would require in order to move in and out of the field of view in the short sample time of the video system. In that case, the anomaly may be considered to be noise rather than a genuine event. Hence, the temporal rule may test whether the same potential anomaly has been identified over a sufficiently long period of time. If not, then the anomaly may be disregarded as being noise. Otherwise, the temporal rule may be considered to be passed.

Processing then proceeds to step 806 at which an event based rule can be applied to the potential anomaly identified by the preceding steps. For example, it might be considered that a genuine image anomaly would have a consistent path through the field of view. That is, a car entering the field of view from the right would be expected to give rise to potential image anomalies in the bottom right, bottom centre right, bottom centre left and bottom left bins in that sequence. Hence, a potential anomaly identified in the bottom right hand bin, middle left centre bin and then top right hand bin might be inconsistent with a genuine new image entity. Hence, an event based rule may also be applied to confirm the genuineness of the potentially identified anomalous image entity. As will be appreciated, anomalous, in this example, does not mean necessarily an error, but merely a new or changed property of the image.

It will be appreciated that in other embodiments, different types of rules may be applied. Also, different combinations of rules may be applied and it may be necessary to pass only a subset of all rules in order for an anomaly to be considered to have been reliably identified. Other variations and modifications will be apparent to a person of ordinary skill in the art from the above discussion.

If at step 768, an anomaly has been detected, then at step 770, the data processing unit 720 may issue one or more output signals at step 770. For example, the data processing unit may issue a control signal to the image capture device 704 in order to control its operation, for example to increase the rate of data capture. Additionally, or alternatively, the data processing unit 720 may issue a command to data store 706 to simply flag or otherwise mark the image data stored in data store 706 as including an anomalous image entity. Additionally, or alternatively, the data processing unit 720 may issue a signal to its own data store 722 to flag the data as relating to an anomalous event. Additionally or alternatively, the data processing unit 720 may issue an alert or alarm signal to a further part of the imaging system 708, for example a display device or alarm, to signal for a user the identification of an anomalous event. Other types of output signal can be provided, as will be apparent to a person of ordinary skill in the art from the above discussion.

It will be appreciated that there are many different applications for anomaly or novelty detection in mage processing. For example, the invention can be used to identify landmarks in scenes captured by a mobile robot (for example for navigation purposes) or for automatic video diaries (for example, to provide automatic location detection).

Generally, embodiments of the present invention, and in particular the processes involved in the identification of anomalous states of the system employ various processes involving data processed by, stored in or transferred through one or more computing or data processing devices. Embodiments of the present invention also relate to an apparatus, which may include one or more individual data processing devices, for performing these operations. This apparatus may be specially constructed for the required purposes, or it may be a general-purpose computer or data processing device, or devices, selectively activated or reconfigured by a computer program and/or data structure stored in the computer or devices. The processes presented herein are not inherently related to any particular computer or other apparatus. In particular, various general-purpose machines may be used with programs written in accordance with the teachings herein, or it may be more convenient to construct a more specialized apparatus to perform the required method steps.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 12:
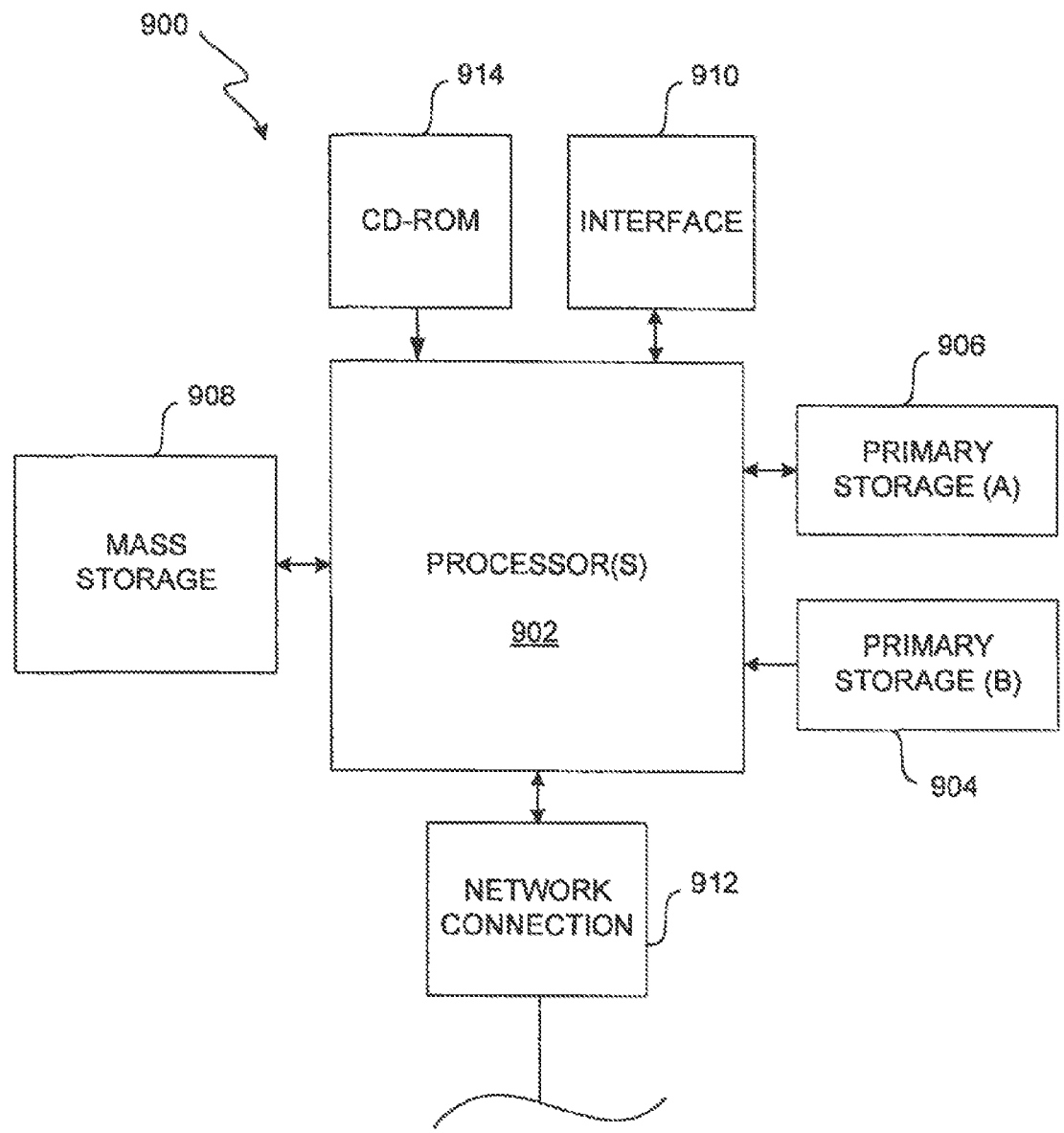
FIG. 12 shows a block diagram of a data processing device suitable for implementing the first or second embodiment of the invention.

FIG. 12 illustrates a typical computer system that, when appropriately configured or designed, can serve as an apparatus of this invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). CPU 902 may be of various types including microcontrollers and microprocessors such as programmable devices (e.g., CPLDs and FPGAs) and unprogrammable devices such as gate array ASICs or general purpose microprocessors. As is well known in the art, primary storage 904 acts to transfer data and instructions uni-directionally to the CPU and primary storage 906 is used typically to transfer data and instructions in a bi-directional manner. Both of these primary storage devices may include any suitable computer-readable media such as those described above. A mass storage device 908 is also coupled bi-directionally to CPU 902 and provides additional data storage capacity and may include any of the computer-readable media described above. Mass storage device 908 may be used to store programs, data and the like and is typically a secondary storage medium such as a hard disk. It will be appreciated that the information retained within the mass storage device 908, may, in appropriate cases, be incorporated in standard fashion as part of primary storage 406 as virtual memory. A specific mass storage device such as a CD-ROM 914 may also pass data uni-directionally to the CPU.

CPU 902 can also be coupled to an interface 910 that can connect to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to an external device such as a database or a computer or telecommunications network using an external connection as shown generally at 912. With such a connection, it is contemplated that the CPU might receive information from the network, or might output information to the network in the course of performing the method steps described herein.

Although the above has generally described the present invention according to specific processes and apparatus, the present invention has a much broader range of applicability. In particular, aspects of the present invention are not limited to any specific type of industrial system and can be applied to virtually any type of industrial system in which one or more sensors are available to provide time series data relating to one or more properties of the system. One of ordinary skill in the art would recognize other variants, modifications and alternatives in light of the foregoing discussion.

The invention claimed is:

1. A real-time method for identifying an anomalous state of a system, the anomalous state being a difference in operation of the system away from a normal mode of operation, the system including a sensor outputting time series data items relating to a property of the system, the method comprising:
   receiving a current data item from the sensor;
   recursively calculating an estimate of a current data density for the time series data items using the current data item, wherein said data density is a measure of the total distances in a data space between data items of said time series data;
   recursively calculating at least one statistical property of the estimate of the current data density, wherein the at least one statistical property comprises the current mean of the estimate of the current data density;
   determining from the at least one statistical property whether the current data item indicates an anomalous state of the system, the anomalous state being a difference in operation of the system away from a normal mode of operation; and
   outputting a signal if it is determined that the current data item indicates an anomalous state of the system.

2. The method of claim 1, wherein the at least one statistical property further comprises the current variance of the estimate of the current data density.

3. The method of claim 2, wherein the current data item is determined to be anomalous based on the degree of difference between the estimate of the current data density and the current mean of the current data density.

4. A real-time method for identifying an anomalous state of a system, the system including a sensor outputting time series data items relating to a property of the system, the method comprising:
   receiving a current data item from the sensor;
   recursively calculating an estimate of a current data density for the time series data items using the current data item,
   recursively calculating at least one statistical property of the estimate of the current data density;
   determining from the at least one statistical property whether the current data item indicates an anomalous state of the system, wherein the at least one statistical property includes the current mean of the current data density and the current variance of the current data density, and wherein the current data item is determined to be anomalous based on the degree of difference between the estimate of the current data density and the current mean of the current data density and wherein the current data item is determined to be anomalous if the difference between the estimate of the current data density and the current mean of the current data density is greater than three standard deviations of the current mean of the current data density; and
   outputting a signal if it is determined that the current data item indicates an anomalous state of the system.

5. The method of claim 1, further comprising applying a further test to determine whether the current data item is anomalous.

6. The method of claim 5, wherein the further test is selected from: a temporal based test; and an event based test.

7. The method of claim 1, and further comprising:
   recursively calculating a mean value of the data item using the current data item; and
   recursively calculating a scalar product for the data item using the current data item.

8. The method of claim 7, and further comprising:
   using the mean value of the data item and the scalar product of the data item to recursively calculate the estimate of the current data density.

9. The method of claim 1, wherein the system includes a plurality of sensors each outputting time series data items relating to a different property of the system and wherein the method is applied to current data items respectively received from each of the plurality of sensors.

10. The method of claim 9, wherein determining comprises determining from the at least one statistical property whether a subset of current data items of the plurality of data items indicate an anomalous state of the system.

11. The method of claim 9, wherein determining comprises determining from the at least one statistical property whether all current data items of the plurality of data items indicate an anomalous state of the system.

12. The method of claim 1, wherein the signal is selected from: a control signal; a feedback signal; an alarm signal; a command signal; a warning signal; an alert signal; a servo signal; a trigger signal; a data capture signal; and a data acquisition signal.

13. The method of claim 1, wherein the system is an electrical or electro-mechanical system.

14. A real-time method for identifying an anomalous state of a system, the system including a sensor outputting time series data items relating to a property of the system, the method comprising:
   receiving a current data item from the sensor;
   recursively calculating an estimate of a current data density for the time series data items using the current data item, recursively calculating at least one statistical property of the estimate of the current data density;
   determining from the at least one statistical property whether the current data item indicates an anomalous state of the system, wherein the at least one statistical property includes the current mean of the current data density and the current variance of the current data density, and wherein the current data item is determined to be anomalous based on the degree of difference between the estimate of the current data density and the current mean of the current data density and wherein the current data item is determined to be anomalous if the difference between the estimate of the current data density and the current mean of the current data density is greater than three standard deviations of the current mean of the current data density; and
   outputting a signal if it is determined that the current data item indicates an anomalous state of the system;
   wherein the system is an electrical or electro-mechanical system, and wherein the system is a video system, the sensor is an image sensor and the time series data is colour video data or greyscale video data.

15. The method of claim 14, wherein the property is a sub-region of a frame of video data.

16. A data processing apparatus for identifying an anomalous state of a system in real time, the anomalous state being a difference in operation of the system away from a normal mode of operation, the system including a sensor outputting time series data items relating to a property of the system, the apparatus comprising:
   a data processing device; and
   a storage device in communication with the data processing device, the storage device storing computer program code executable by the data processing device to carry out steps for identifying the anomalous state of the system, the steps comprising:

receiving a current data item from the sensor;

recursively calculating an estimate of a current data density for the time series data items using the current data item, wherein said data density is a measure of the total distances in a data space between data items of said time series data;

recursively calculating at least one statistical property of the estimate of the current data density, wherein the at least one statistical property comprises the current mean of the estimate of the current data density;

determining from the at least one statistical property whether the current data item indicates an anomalous state of the system, the anomalous state being a difference in operation of the system away from a normal mode of operation; and outputting a signal if it is determined that the current data item indicates an anomalous state of the system.

17. A system, the system comprising:

at least one operative part;

at least one sensor for measuring a property of the operative part, the sensor outputting time series data items relating to a property of the system; and a data processing apparatus in communication with the sensor to receive time series data from the sensor, the data processing apparatus comprising:

a data processing device; and a storage device in communication with the data processing device, the storage device storing computer program code executable by the data processing device to carry out steps for identifying an anomalous state of a system being a difference in operation of the system away from a normal mode of operation, the steps comprising:

receiving a current data item from the sensor;

recursively calculating an estimate of a current data density for the time series data items using the current data item, wherein said data density is a measure of the total distances in a data space between data items of said time series data;

recursively calculating at least one statistical property of the estimate of the current data density, wherein the at least one statistical property comprises the current mean of the estimate of the current data density;

determining from the at least one statistical property whether the current data item indicates an anomalous state of the system, the anomalous state being a difference in operation of the system away from a normal mode of operation of the system; and outputting a signal if it is determined that the current data item indicates an anomalous state of the system.

18. A system as claimed in claim 17, wherein the data processing apparatus has an output which is in communication with the system to output the signal to the system.

19. A computer readable medium storing in non-transitory form computer program code executable by a data processing device to carry out real-time steps for identifying an anomalous state of a system, the anomalous state being a difference in operation of the system away from a normal mode of operation of the system, the system including a sensor outputting time series data items relating to a property of the system, the real-time steps comprising:

receiving a current data item from the sensor;

recursively calculating an estimate of a current data density for the time series data items using the current data item, wherein said data density is a measure of the total distances in a data space between data items of said time series data;

recursively calculating at least one statistical property of the estimate of the current data density, wherein the at least one statistical property comprises the current mean of the estimate of the current data density;

determining from the at least one statistical property whether the current data item indicates an anomalous state of the system, the anomalous state being a difference in operation of the system away from a normal mode of operation; and outputting a signal if it is determined that the current data item indicates an anomalous state of the system.

* * * * *